United States Patent
Jain et al.

(10) Patent No.: US 9,922,007 B1
(45) Date of Patent: Mar. 20, 2018

(54) SPLIT BROWSER ARCHITECTURE CAPABLE OF DETERMINING WHETHER TO COMBINE OR SPLIT CONTENT LAYERS BASED ON THE ENCODING OF CONTENT WITHIN EACH LAYER

(71) Applicant: Amazon Technologies, Inc., Reno, NV (US)

(72) Inventors: Saral Jain, Bellevue, WA (US); Dmitry Sokolowski, Seattle, WA (US); James Alan Umstot, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 53 days.

(21) Appl. No.: 14/285,442

(22) Filed: May 22, 2014

(51) Int. Cl.
*G06F 17/00* (2006.01)
*G06F 17/22* (2006.01)
*G06F 17/30* (2006.01)
*H04L 29/08* (2006.01)

(52) U.S. Cl.
CPC .... *G06F 17/2247* (2013.01); *G06F 17/30905* (2013.01); *H04L 67/02* (2013.01); *H04L 67/28* (2013.01)

(58) Field of Classification Search
CPC .......... G06F 17/30905; G06F 17/2247; H04L 67/02; H04L 67/04; H04L 67/28; H04N 21/234; H04N 21/863
See application file for complete search history.

(56) References Cited

U.S. PATENT DOCUMENTS

| | | | |
|---|---|---|---|
| 5,930,472 A | 7/1999 | Smith | |
| 5,978,842 A | 11/1999 | Noble et al. | |
| 6,230,168 B1 | 5/2001 | Unger et al. | |
| 6,271,840 B1 | 8/2001 | Finseth et al. | |
| 6,356,908 B1 | 3/2002 | Brown et al. | |
| 6,657,647 B1 | 12/2003 | Bright | |
| 7,051,084 B1 | 5/2006 | Hayton et al. | |
| 7,191,211 B2 | 3/2007 | Tuli | |
| 7,296,230 B2 | 11/2007 | Fukatsu et al. | |
| 7,310,769 B1 | 12/2007 | Dash | |
| 7,499,051 B1 * | 3/2009 | O'Donnell | G06T 15/503 345/421 |
| 7,917,618 B1 | 3/2011 | Bettis et al. | |
| 8,103,742 B1 | 1/2012 | Green | |

(Continued)

OTHER PUBLICATIONS

Weintraub, L., "How WebKit Renders the Web," Fluent Conference, May 31, 2012, 67 pages.*

(Continued)

*Primary Examiner* — Cesar Paula
*Assistant Examiner* — James H Blackwell
(74) *Attorney, Agent, or Firm* — Knobbe, Martens, Olson & Bear LLP

(57) ABSTRACT

An intermediary system operates as an intermediary between content servers and user devices, and provides services for improving page load times as seen by end users. One such service involves converting a retrieved content page (e.g., web page) into a number of encoded layers that can be decoded and rendered by the user device. The intermediary system determines a suitable encoding technique for each of the layers. The intermediary system sends the encoded layers to a browser component running on the user device for rendering by the GPU.

22 Claims, 6 Drawing Sheets

(56) References Cited

U.S. PATENT DOCUMENTS

| | | | |
|---|---|---|---|
| 8,234,392 B2* | 7/2012 | Graffagnino | G06F 17/2205 709/230 |
| 8,314,809 B1 | 11/2012 | Grabowski et al. | |
| 8,331,566 B1 | 12/2012 | Foote et al. | |
| 8,365,144 B1 | 1/2013 | Webb | |
| 8,539,338 B2 | 9/2013 | Zhu et al. | |
| 8,610,725 B2* | 12/2013 | Sandmel | G06T 15/005 345/501 |
| 8,732,571 B2 | 5/2014 | Jain et al. | |
| 8,769,052 B1 | 7/2014 | Tidd | |
| 8,913,067 B1* | 12/2014 | Kokkevis | G06F 9/38 345/522 |
| 8,913,068 B1* | 12/2014 | Kokkevis | G06F 17/30905 345/522 |
| 8,990,674 B2 | 3/2015 | Shibukawa et al. | |
| 9,454,515 B1 | 9/2016 | Jain | |
| 9,563,928 B1 | 2/2017 | Sokolowski et al. | |
| 9,563,929 B1 | 2/2017 | Sokolowski et al. | |
| 2001/0038395 A1 | 8/2001 | Holtzblatt | |
| 2001/0032238 A1 | 10/2001 | Cronin, III et al. | |
| 2002/0015042 A1 | 2/2002 | Robotham | |
| 2002/0091738 A1* | 7/2002 | Rohrabaugh | G06F 9/4443 715/249 |
| 2002/0170053 A1 | 11/2002 | Peterka et al. | |
| 2003/0014478 A1 | 1/2003 | Noble | |
| 2003/0158916 A1 | 8/2003 | Cronin, III et al. | |
| 2003/0200507 A1* | 10/2003 | Stern | G06F 17/211 715/234 |
| 2004/0135784 A1 | 7/2004 | Cohen et al. | |
| 2004/0186861 A1 | 9/2004 | Phatak | |
| 2004/0239681 A1 | 12/2004 | Robotham et al. | |
| 2005/0232227 A1 | 10/2005 | Jorgenson et al. | |
| 2005/0243097 A1 | 11/2005 | Cohen et al. | |
| 2005/0256836 A1 | 11/2005 | Awamoto et al. | |
| 2007/0156972 A1 | 7/2007 | Uehara | |
| 2007/0263007 A1 | 11/2007 | Robotham et al. | |
| 2007/0271288 A1* | 11/2007 | Martin | H04N 19/25 |
| 2007/0288841 A1 | 12/2007 | Rohrabaugh et al. | |
| 2008/0018658 A1* | 1/2008 | Bruno | G06F 17/3089 345/581 |
| 2008/0034292 A1* | 2/2008 | Brunner | G06T 13/00 715/700 |
| 2008/0055623 A1 | 3/2008 | Piersol et al. | |
| 2008/0077862 A1* | 3/2008 | Tolpin | G06F 17/243 715/277 |
| 2008/0120626 A1* | 5/2008 | Graffagnino | G06F 17/2205 719/320 |
| 2008/0222273 A1 | 9/2008 | Lakshmanan et al. | |
| 2008/0229025 A1 | 9/2008 | Plamondon | |
| 2008/0235594 A1 | 9/2008 | Bhumkar et al. | |
| 2008/0295164 A1 | 11/2008 | Steiner et al. | |
| 2009/0030976 A1* | 1/2009 | Shukla | H04L 65/4015 709/203 |
| 2009/0033986 A1 | 2/2009 | Himpe | |
| 2009/0089448 A1 | 4/2009 | Sze et al. | |
| 2009/0100257 A1* | 4/2009 | Sandmel | G06T 15/005 713/100 |
| 2009/0100356 A1 | 4/2009 | Kujda | |
| 2009/0125799 A1 | 5/2009 | Kirby | |
| 2009/0158141 A1 | 6/2009 | Bauchot et al. | |
| 2009/0177996 A1 | 7/2009 | Hunt et al. | |
| 2009/0189890 A1 | 7/2009 | Corbett et al. | |
| 2009/0228782 A1* | 9/2009 | Fraser | G06F 17/30905 715/234 |
| 2009/0238279 A1* | 9/2009 | Tu | H04N 19/30 375/240.16 |
| 2009/0307571 A1 | 12/2009 | Gowda et al. | |
| 2009/0307603 A1 | 12/2009 | Gowda et al. | |
| 2010/0194753 A1 | 8/2010 | Robotham et al. | |
| 2010/0269152 A1 | 10/2010 | Pahlavan et al. | |
| 2011/0078333 A1 | 3/2011 | Jakubowski | |
| 2011/0078593 A1 | 3/2011 | Matsui | |
| 2011/0145695 A1 | 6/2011 | Matsui | |
| 2011/0197126 A1 | 8/2011 | Arastafar | |
| 2011/0225520 A1 | 9/2011 | Watanabe | |
| 2011/0231746 A1 | 9/2011 | Rohrabaugh et al. | |
| 2012/0022942 A1 | 1/2012 | Holloway et al. | |
| 2012/0054166 A1 | 3/2012 | Jeremias | |
| 2012/0084663 A1 | 4/2012 | Momchilov et al. | |
| 2012/0102416 A1 | 4/2012 | Chmiel | |
| 2012/0110435 A1 | 5/2012 | Green | |
| 2012/0117145 A1* | 5/2012 | Clift | G06F 9/4445 709/203 |
| 2012/0151094 A1* | 6/2012 | Cooke | G06F 17/30861 709/250 |
| 2012/0151308 A1 | 6/2012 | Falkenberg | |
| 2012/0159308 A1 | 6/2012 | Tseng et al. | |
| 2012/0188280 A1 | 7/2012 | Charlesbois et al. | |
| 2012/0215834 A1 | 8/2012 | Chen et al. | |
| 2012/0254727 A1 | 10/2012 | Jain et al. | |
| 2012/0265802 A1 | 10/2012 | Shen et al. | |
| 2013/0050249 A1 | 2/2013 | Grabowski et al. | |
| 2013/0080895 A1 | 3/2013 | Rossman | |
| 2013/0145259 A1 | 6/2013 | Kiefer, III et al. | |
| 2013/0159923 A1 | 6/2013 | French et al. | |
| 2013/0185633 A1 | 7/2013 | Bunker et al. | |
| 2013/0212462 A1* | 8/2013 | Athas | H04L 67/10 715/234 |
| 2014/0012685 A1* | 1/2014 | Le Chevalier | G06Q 30/02 705/14.73 |
| 2014/0053054 A1 | 2/2014 | Shen | |
| 2014/0059421 A1 | 2/2014 | Chibisov et al. | |
| 2014/0129920 A1 | 5/2014 | Sheretov et al. | |
| 2014/0136942 A1 | 5/2014 | Kumar et al. | |
| 2014/0136951 A1 | 5/2014 | Kumar et al. | |
| 2014/0136971 A1 | 5/2014 | Kumar et al. | |
| 2014/0136973 A1 | 5/2014 | Kumar et al. | |
| 2014/0281896 A1 | 9/2014 | Wiitala et al. | |
| 2015/0026566 A1 | 1/2015 | Hui et al. | |
| 2015/0089355 A1 | 3/2015 | Peng et al. | |
| 2015/0121193 A1 | 4/2015 | Beveridge et al. | |
| 2015/0193409 A1 | 7/2015 | Portnoy et al. | |
| 2015/0271188 A1 | 9/2015 | Call | |
| 2015/0293929 A1 | 10/2015 | Namgung | |
| 2017/0011017 A1 | 1/2017 | Jain | |

OTHER PUBLICATIONS

Garsiel, T. et al.,"How Browsers Work: Behind the Scenes of Modern Web Browsers," © Aug. 5, 2011, from HTML 5 Rocks, 57 pages.*
Grosskurth et al.,"Architecture and Evolution of the Modern Web Browser," © Jun. 20, 2006 Elsevier Science, 24 pages.*
Stoyan Stephanov, "Rendering: repaint, reflow/relayout, restyle," © Dec. 17, 2009, Stoyan's phpied.com, 16 pages.*
Herostratus' Legacy,"Composited Video Support in WebKitGTK+," © 2013, 9 pages.*
Wiltzius, T., "Accelerated Rendering in Chrome," © Mar. 11, 2013, 11 pages.*
Xiao, Y. et al.,"Web Page Adaptation for Small Screen Mobile Device: A New P2P Collaborative Deployment Approach," © 2008, IEEE, pp. 191-196.*
Kokkevis, Vangelis "GPU Accelerated Compositing in Chrome" The Chromium Projects, 2012, 9 pages.
Anonymous, "ShrinkTheWeb (STW) Website Previews Plugin", http://web.archive.org/web/20120710154658/http://wordpress.org/extend/plugins/shrinktheweb-website-preview-plugin/screenshots/, Jul. 10, 2012, 3 pages.
Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.
Esteveo, Martin, "Tiling in DirectX: Part 1", from gamedev.net, Jul. 24, 2000, 5pgs.
Esteveo, Martin, "Tiling in OpenGL", from gamedev.net, Dec. 12, 2000, 6 pgs.
PCWorld, Hands-on: Chrome Remote Desktop app for Android makes remote PC access easy, available at http://www.pcworld.com/article/2144562/hands-on-chrome-remote-desktop-app-for-an-

(56) References Cited

OTHER PUBLICATIONS droid-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

Bahl et al., "Advancing the State of Mobile Cloud Computing", MCS' 12, Jun. 25, 2012, pp. 21-27.

Björk et al., "WEST: A Web Browser for Small Terminals", CHI Letters, 1999, vol. 1, No. 1, pp. 187-196.

Buyukkokten et al., "Power Browser: Efficient Web Browsing for PDAs", CHI Letters, 2000, vol. 2, No. 1, Apr. 1-6, 2000, pp. 430-437.

Deboosere et al., "Thin Client Computing Solutions in Low- and High-Motion Scenarios", Third International Conference on Networking and Services (ICNS'07), 2007, pp. 6.

Delwadia, Vipul, "RemoteME: Experiments in Thin-Client Mobile Computing", Thesis for Master of Science in Computer Science, Victoria University of Wellington, 2009, pp. 114.

Dyken et al., "A Framework for OpenGL Client-Server Rendering", 2012 IEEE 4th International Conference on Cloud Computing Technology and Science, 2012, pp. 729-734.

Fox et al., "Experience With Top Gun Wingman: A Proxy-Based Graphical Web Browser for the 3Com PalmPilot", Middleware'98, Session 9, 1998, pp. 407-424.

Freytag et al., "Resource Adaptive WWW Access for Mobile Applications", Computers & Graphics, 1999, vol. 23, pp. 841-848.

Han et al., "Dynamic Adaptation in an Image Transcoding Proxy for Mobile Web Browsing", IEEE Personal Communications, Dec. 1998, pp. 8-17.

Ku et al., "The Amazon Kindle Fire: Benchmarked, Tested, and Reviewed", http://www.tomshardware.com/reviews/amazon-kindle-fire-review,3076.html, Nov. 23, 2011, pp. 37.

Stokes, Jon, "Amazon's Silk is More Than Just a Browser: It's a Cloud OS for the Client", http://web.archive.org/web/20121217033708/http://www.wired.com/insights/2011/09/amazon-silk, Sep. 28, 2011, pp. 4.

Tendulkar et al., "Abusing Cloud-Based Browsers for Fun and Profit", ACSAC '12, Dec. 3-7, 2012, pp. 219-228.

Wang et al., "Accelerating the Mobile Web with Selective Offloading", MCC' 13, Aug. 12, 2013, pp. 45-50.

Xiao et al., "Browsing on Small Displays by Transforming Web Pages into Hierarchically Structured Subpages", ACM Transactions on the Web, Jan. 2009, vol. 3, No. 1, pp. 36.

Zavou et al., "Exploiting Split Browsers for Efficiently Protecting User Data", CCSW' 12, Oct. 19, 2012, pp. 37-42.

International Search Report and Written Opinion in PCT Application No. PCT/US2013/069733, dated Jun. 30, 2014.

\* cited by examiner

SPLIT BROWSER ARCHITECTURE CAPABLE OF DETERMINING WHETHER TO COMBINE OR SPLIT CONTENT LAYERS BASED ON THE ENCODING OF CONTENT WITHIN EACH LAYER

CROSS-REFERENCE TO CONCURRENTLY-FILED APPLICATIONS

The present application's Applicant is concurrently filing the following U.S. patent applications on May 22, 2014:

| Application Ser. No. | Title |
|---|---|
| 14/285,317 | EMULATION OF CONTROL RESOURCES FOR USE WITH CONVERTED CONTENT PAGES |
| 14/285,492 | DELIVERY AND DISPLAY OF PAGE PREVIEWS USING HARDWARE-INDEPENDENT GRAPHICS COMMANDS |
| 14/281,200 | ON-DEMAND DETECTION OF USER INPUT TARGETS |
| 14/285,060 | CONVERSION OF CONTENT PAGES INTO SETS OF TILES FOR DELIVERY TO AND EFFICIENT DISPLAY ON USER DEVICES |
| 14/285,275 | TRANSFERRING DAMAGED PORTIONS OF A RENDERED PAGE TO A USER DEVICE |
| 14/285,334 | UPDATING DAMAGED PORTIONS OF RENDERED PAGES THAT CONTAIN VIDEO CONTENT |
| 14/285,300 | SPLIT BROWSER ARCHITECTURE CAPABLE OF DELIVERING VIDEO STREAMS TO USER DEVICES |
| 14/285,477 | DISTRIBUTED CONTENT BROWSING SYSTEM USING TRANSFERRED HARDWARE-INDEPENDENT GRAPHICS COMMANDS |
| 14/285,531 | BANDWIDTH REDUCTION THROUGH DELIVERY OF HARDWARE-INDEPENDENT GRAPHICS COMMANDS FOR PORTIONS OF CONTENT PAGES |
| 14/285,557 | CACHING OF CONTENT PAGE LAYERS |
| 14/285,504 | SPLIT BROWSER ARCHITECTURE CAPABLE OF DELIVERING GRAPHICS COMMANDS TO USER DEVICES |

The disclosures of the above-referenced applications are hereby incorporated by reference.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

Various methods exist for reducing the delay experienced by users. Some methods include the use of caching proxy servers, which store recently-retrieved versions of content and provide the content to users faster than origin servers may be able to do so. For example, a caching proxy may be located closer (in either a geographic or networking sense) to a client device, or the caching proxy may have a faster network connection to the client device. Origin servers may also deploy certain content onto content delivery network ("CDN") servers. Client devices requesting the content may be directed to the closest CDN server or to a CDN server that can otherwise provide the requested content faster than the origin server. Other methods of reducing the delay experienced by users include the use of proxy servers or other intermediary systems that compress or re-format content. Such processed content may be transferred to client devices faster, or may require less processing by the client devices to render the content.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
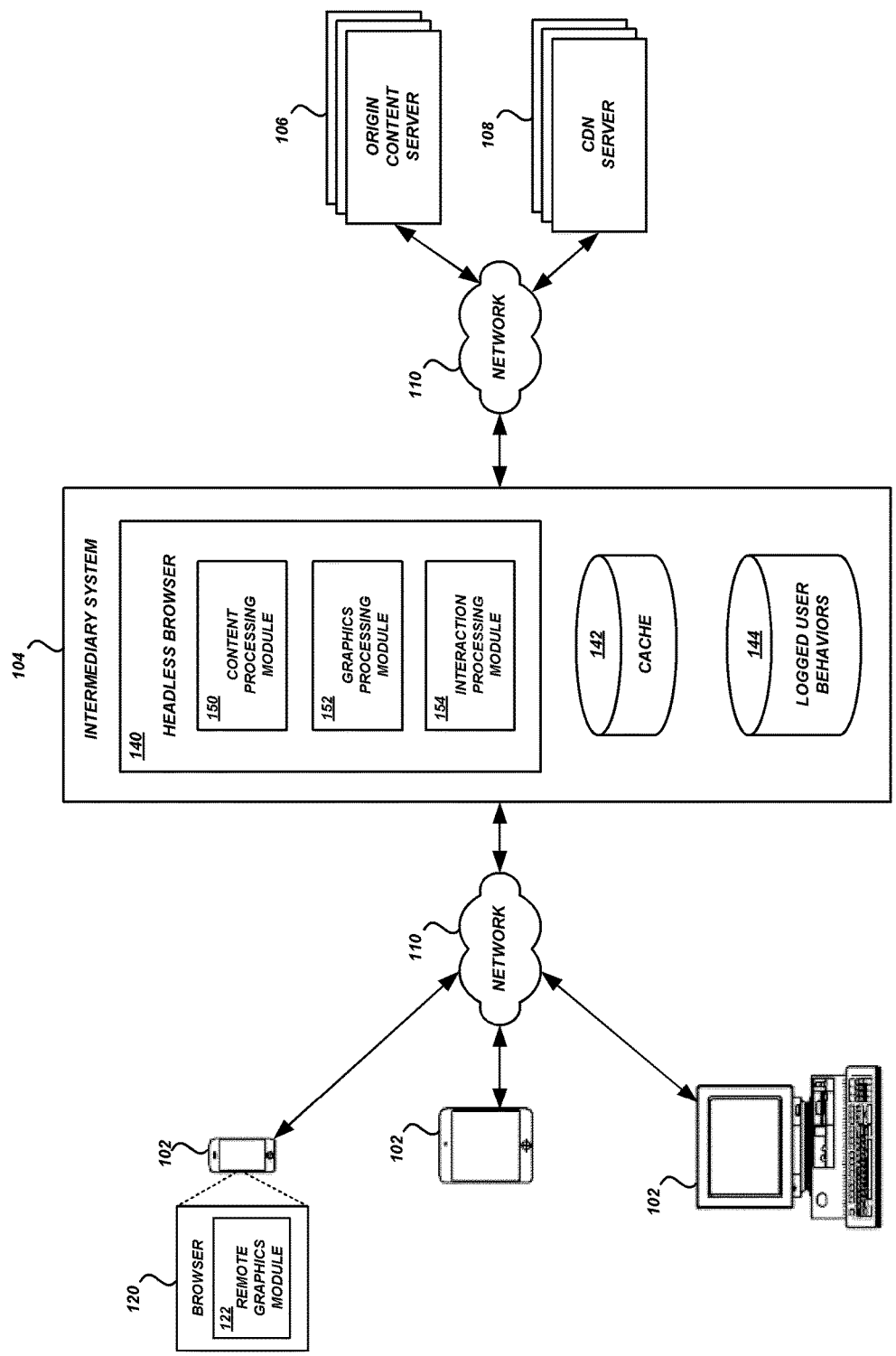
FIG. 1 illustrates a content delivery environment with an intermediary system that processes content and generates display commands for execution on user devices according to one embodiment.

The present disclosure involves an architecture in which the functions of a network content browsing system (e.g., a "web browser" application) are distributed among a browser component running on a server and a browser component running on a user device. The server-based browser component can retrieve and render content (e.g., web pages) on behalf of a user device, and generate, for delivery to the user device, layers of the content that can be composited by the user device to display a visual representation of the content. The sever-based browser may retrieve the content in response to a user request, generate a document object model representation of the content, generate a render tree based on the document object model representation ("DOM"), generate a layer tree based on the render tree including content and layout of encoded layers, and provide the layer tree to the browser component running at the user device. The server-based browser may also determine a suitable type of encoding for each layer based on the content of the layer and send each layer to a user device using the determined type of encoding. This can help optimize quality and reduce bandwidth in some embodiments. In this configuration, the server-based browser component may be referred to as a "headless browser," and the browser component running at the user device may be referred to as a "client browser." The client browser can decode and composite the layers in the layer tree to display requested content without the content processing that would normally be required by the user device.

For at least some types of content pages and content, the above process results in reduced "page-load" times as experienced by users. This reduction is due in-part to the reduced or eliminated need for the client browser to process the page coding (e.g., HTML, JavaScript, etc.) of the pages. In some cases the process also reduces the quantity of data transmitted to the user device.

Conventional browser applications executing on a user device typically request content on a particular network address (e.g., www.abc.xyz) directly from an origin server at the network address, indirectly from a content delivery network ("CDN") server configured to provide content on behalf of the origin server, via an intermediary system such as a proxy, or though some other route. The requested content may be received in the form of an HTML file, which is then parsed by the browser application to identify any objects (e.g., images, videos, style sheets, script files, etc.) referenced by the HTML file. The referenced objects are then retrieved in a manner that is similar or identical in many respects to the retrieval of the HTML file. The browser application constructs a Document Object Model ("DOM") tree based on the parsed HTML file and the referenced objects. The DOM tree includes nodes for each element of the requested content (e.g., individual HTML tags, referenced objects, scripts, etc.). A render tree is constructed using style information (e.g., from referenced cascading style sheets) and the visual elements from the DOM tree in the order in which they are to be displayed. The purpose of the render tree is to enable painting of the elements in the correct order. The render tree is traversed and a paint command is executed for each node in order to display content on the screen.

Performance of the browser application is typically dependent upon the latencies and resource requirements associated with each of the processes summarized above. If a user device has a low-bandwidth network connection, then retrieval of the content may introduce substantial latency before much of the processing to be performed on the user device may begin. If a user device does not have enough computing resources (e.g., CPU capacity, available memory, etc.), the processing of content after it is retrieved may introduce substantial latency before or during painting of the content to the user device display.

As an alternative to implementing the browser fully on the user device, an intermediary system or system, for example a headless browser implemented on a remote server or other device, can be used to perform various steps of the content page rendering process described above, offloading some of the processing required to access the content page from the user device to the intermediary system. For example, the intermediary system may retrieve and pre-render a content page for a user device, and then deliver the pre-rendered page to the user device as one or more bitmap images. Although this approach is reduces user-perceived page load times for many pages, the transfer of bitmap images sometimes consumes significant network bandwidth and introduces delay.

The foregoing and other problems are addressed, in some embodiments, by the layer transfer rendering process described herein in which an intermediary system generates the DOM of a content page, generate a render tree based on the document object model representation ("DOM"), generate a layer tree based on the render tree including content and layout of encoded layers, and provide the layer tree to a browser component of a user device using the determined type of encoding. The user device decodes and composites the encoded layers to render a visual representation of the content page. Thus, the task of rendering the page is divided between the intermediary system and the user device. Such later transfer rendering techniques can provide performance improvements including significant reductions in user-perceived page load times compared to running the browser entirely on the user device, and can additionally provide performance improvements including reduction in bandwidth usage compared to traditional headless browser implementations. For instance, when content is updating, the layer transfer rendering technique can send updated rendering instructions only for layers of the content that have changed compared to a previous instance. In addition, if page layers move relative to each other without changing content, the layer transfer rendering technique can send updated layout data that can be used to rearrange the layers without re-rendering the content.

In some cases, the intermediary system may determine a suitable encoding technique for each visible layer based on the content of the layer. This may be done to increase the visual quality of the layer in a visual representation of the content page on the user device and/or to decrease bandwidth usage in sending the layer to the user device. For example, the intermediary system may identify a video included in the content of a layer and may send the layer including the video in pre-coded bytes to the user device to be decoded by the user device. As another example, the intermediary system may identify static text in the content of a layer and may provide instructions in drawing language, such as Skia, to the user device for rendering the layer including the static text. Further, the intermediary system may identify an image in the content of a layer and send the layer to the user device as original or encoded image bytes.

In some embodiments, the intermediary system may analyze the layers and determine whether combining two or more layers would optimize performance based on factors such as network bandwidth, processing capabilities of the user device, and the ability of the user device to locally handle updates, to name a few. If the same type of encoding is determined to be suitable for two or more layers, then those layers can be combined into a single layer in some cases. The intermediary system may also analyze the layers to determine whether splitting a layer into multiple layers would optimize performance. For example, if a portion of a content page is scrollable by itself, that portion may be parsed into a single layer in the render tree. The intermediary system may analyze the content in the single layer corresponding to the scrollable portion and identify images, static text, and user interface elements. The intermediary system can split the layer corresponding to the scrollable portion into two separate visible layers: first, a graphical content layer including the images and user interface elements and second, a text layer to display the static text above the graphical content layer. The intermediary system can also generate a non-visible interactivity layer including instructions regarding locations and associated functions of user selectable options in the scrollable portion.

In some embodiments, one or both of the user device and intermediary system can assess, for a given content page, whether transferring the layers of the content page to the user device will reduce a user-perceived page load time relative to at least one alternative rendering technique. In some cases, the user device and/or intermediary system can determine whether the layer transfer rendering technique is preferable for a given page load based on a number of factors, for example the speed, bandwidth, latency, and type of network connection with user device as well as characteristics of the content site and whether this feature is supported by the user device. In one example, the user device and/or intermediary system can assess whether compositing of the layers on the user device will reduce a user-perceived page load time relative to compositing of the layers on the intermediary system. In another example, the user device and/or intermediary system can assess whether generating the render tree and layer tree on the intermediary system will reduce a user-perceived page load time relative to generating the render tree and layer tree on the user device.

Some embodiments of the intermediary system can determine, based on a variety of factors such as network connection parameters and user device capabilities, whether to prioritize transmission of some layers to the user device over transmission of other layers to a user device, or whether to send a prioritized portion of some or all of the layers. For example, the intermediary system can prioritize layers that would be visible to a user in an initial page configuration over layers that would not be visible in the initial page configuration, such as a layer that is obscured by another layer that can subsequently move due to javascript or a layer that is outside the current scrolled view of the page. In some embodiments, the intermediary system can detect or receive an indication that a user device has limited resources such as RAM, and accordingly the intermediary system can only send to the user device layer tree data for rendering a predetermined number of page lengths above/below a current scroll position of the user.

In the process described herein, the bandwidth-intensive bitmap typically used to send pre-rendered page content from the intermediary system to the user device is replaced by (typically) more bandwidth efficient encoded layers. The user device can composite the layers, that is, use the layers in the correct order to paint the visual representation of the content page.

Aspects of the present disclosure relate to splitting the graphics pipeline of a browser application among server-based and client-based browser components (e.g., between a headless browser and a client browser). The server (or servers) on which a headless browser instance is running may have access to a network connection that is substantially faster than the network connection available to the user device, and can therefore retrieve content much more quickly than the user device. Alternatively or in addition, the server(s) may have substantially more computing resources than the user device, and may therefore perform the content processing summarized above and described in greater detail below much more quickly and efficiently than the user device. As a result of the faster network connection and/or greater available computing resources, a headless browser instance running on a server may be able to produce layers of content pages faster than a conventional browser application executing on a user device is able to produce the layers.

Although aspects of the embodiments described in the disclosure will focus, for the purpose of illustration, on a distributed browsing system with separate server-based and client-based browser components designed specifically to work in conjunction with one another (e.g., a headless browser instance running on a server and a corresponding client browser instance running on a user device), one skilled in the art will appreciate that the techniques disclosed herein may be applied to any number of services, processes, or applications. In some embodiments, an existing browser application that runs on a user device may be configured to receive encoded layers from a server in lieu of unprocessed content files. For example, a browser add-in or extension may be installed on a user device to facilitate communication with a headless browser, receive encoded layers, decode the encoded layers, and composite the layers, thereby bypassing the parsing and DOM tree construction processes that would normally be performed by the browser application. In some embodiments, browsers executing on user devices may be designed to receive either conventional content files or encoded layers (or a combination thereof). For example, the browser may determine whether to request content files or encoded layers based on current conditions and performance metrics, data regarding prior browsing sessions, or the like. Alternatively or in addition, an intermediary system may determine whether to provide content files or encoded layers based on current conditions, performance metrics, prior browsing sessions, or the like.

Various aspects of the disclosure will now be described with regard to certain examples and embodiments, which are intended to illustrate but not limit the disclosure.

System Components

FIG. 1 illustrates an example network environment in which features can be implemented for processing content pages on an intermediary system and generating display commands for execution on a user device. The network environment shown in FIG. 1 includes various user devices 102, an intermediary system 104, and various content sources, including origin content servers 106 and content delivery network ("CDN") servers 108. The system components may communicate with each other via one or more communication networks 110 in order to deliver layers representing content pages hosted on CDN servers 108 to user devices 102 via intermediary system 104, for example in the form of a layer tree included encoded content of each of a number of layers as well as data regarding layout of the layers, such as layer size and positioning. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated encoded layers, such as those generated by the intermediary system 104. The remote graphics module 122 (or some other module of the browser application 120) can decode the encoded layers and composite the layers to display a representation of the requested content on the user device 102. In some embodiments, remote graphics module 122 can be the graphics processing unit (GPU) of the user device 102 or a module of browser application 120 configured to call the GPU. Advantageously, the remote graphics module 122 may facilitate the display of graphical representations of requested content at the user device 102 without requiring the user device 102 to receive content files (e.g., HTML files, JPEG images, etc.) directly or indirectly from content sources 106 and 108.

In some embodiments, the browser 120 may be a conventional web browser that is not specifically designed or configured to execute remotely-generated graphics commands and other display commands. For example, the browser 120 may use or otherwise be associated with a remote graphics module 122 that is not integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate layers for compositing by the user devices 102. For example, the intermediary system 104 can be a server or group of servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides encoded layers to separate user devices 102 that enable the user devices 102 to cause display of the content. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate encoded layers to display a graphical representation of the content, and transmit the encoded layers to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability. In addition, by sending the layers instead of a fully rendered content page to the user device 102 and allowing the user device 102 to render the content page from the layers, the data communications between user device 102 and intermediary system 104 may be faster and consume less network bandwidth than would be used to send fully rendered content pages.

The headless browser 140 may include various modules to provide the functionality described above and in greater detail below. For example, the headless browser 140 may include a content processing module 150, a graphics processing module 152, and an interaction processing module 154. The content processing module 150 may include any system that can parse content files and generate a document object model ("DOM") representation of the content. Content processing module 150 can also generate a render tree from the DOM mapping visible objects in the DOM to one or more layers.

The graphics processing module 152 may include any system that can receive the render tree and generate encoded layers to render a graphical representation of the content on a user device 102. In some cases, the graphics processing module 152 may include logic for determining one of a number of rendering techniques to use for each of a number of layers in the render tree. Some embodiments of the graphics processing module 152 can analyze the content layers to determine whether to combine or split any layers. For example, the graphics processing module 152 may analyze a layer and determine that a first subset of the content of the layer should be encoded as a video stream and a second subset of the content of the layer should be encoded as graphics commands, such as OpenGL or Skia commands. Graphics processing module 152 can split the layer into two layers according to the determined encoding techniques, encode the layers using the determined video encoding and graphics command encoding, and provide the encoded video stream and graphics commands to the browser 120 and/or the remote graphics module 122. As another example, graphics processing module 152 may identify portions of multiple layers that include static text and determine to use the same rendering technique for all of the static text, such as by sending one or more high resolution tiles of the text together with graphics commands regarding locations of the tiles on the content page, or by sending the text to the user device in the form of Skia commands. Accordingly, graphics processing module 152 can combine the portions of the layers including static text into a single static text layer, encode the static text layer according to the determined encoding, and send the encoded static text layer to the user device.

The interaction processing module 154 may include any system that communicates with the browser 120 to receive information regarding user interactions with the content at the user device 102 and to update one or more layers for rendering the content, if necessary. Further, the interaction processing module 154 may provide the updated layers to the user device 102. In some embodiments, the headless browser 140 may include additional or fewer modules than those shown in FIG. 1, for example the additional modules illustrated in FIG. 2.

As an example, the headless browser may be implemented using the open source Chromium™ browser, with appropriate modifications to implement encoded layer transfer and the other features described herein. In some embodiments, Chromium™ code may be modified to analyze the layers of a content page, determine whether to combine or split the layers, determine a suitable encoding technique for each layer, encode each layer according to the determined encoding technique, and send the encoded layers to a user device. In other embodiments, a headless browser component can be developed specifically to implement the video representation delivery techniques described herein.

The intermediary system 104 may include additional modules, components, data stores, and the like to provide the features described above and in greater detail below. For example, the intermediary system 104 may include a cache 142 that stores content items received form content sources 106 and 108, layers generated by the headless browser 140, and the like. The intermediary system 104 may also include a logged "user behaviors" data store 144 that stores information about user requests and interactions with content.

In some embodiments, the cache 142 may store layer tree representations of content pages generated by the headless browser 140 for a predetermined period of time after the content page request or after connection between the user device and the intermediary system has terminated. Accordingly, if the user of the user device requests the content page again within the predetermined time period, the layer tree and any other data can be retrieved from the cache 142 and delivered to user device 102 without the need to re-generate the layer tree. In some embodiments, persistence of layer tree data in the cache 142 can reduce user-perceived page load times for recently requested pages. For instance, if a user device runs out of battery power or otherwise powers down in the middle of a browsing session, the layer tree may be quickly retrieved and re-delivered to the user device upon powering on and reestablishing connection with the intermediary system 104. In some embodiments, interactions stored in the logged user behaviors data store 144 can be used to deliver a layer tree for rendering a representation of the content page reflecting previous user interactions with the page. In other embodiments, the cache 142 may store a layer tree representing a most recent visual representation displayed on the user device.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Although in the examples described herein the intermediary system 104 is configured to communicate between the origin content servers 106 and CDN servers 108 and user devices 102 to execute the layer transfer rendering techniques, in some embodiments the origin content servers 106 and/or CDN servers 108 can be configured to generate layer tree representations of content pages and send encoded layers directly to a user device. For example, the capability to perform the layer transfer rendering techniques can be provided to origin content servers 106 and CDN servers 108 in the form of an add-in or extension. The origin content servers 106 or CDN servers 108 can, in some embodiments, assess whether the layer transfer rendering techniques should be used for a given page request based on factors such as whether the techniques would result in reduced user-perceived page load time, processor usage, or battery usage, among other things, relative to at least one alternative rendering technique. In some cases, the content servers 106 or CDN servers 108 can determine whether the layer transfer rendering technique is preferable for a given page load based on a number of factors, for example the speed, bandwidth, latency, and type of network connection with user device as well as characteristics of the content site and whether this feature is supported by the user device. Accordingly, any of the layer tree rendering actions described herein as being performed by the intermediary system can, in some embodiments, be performed additionally or exclusively by the origin content servers 106 and/or CDN servers 108, in which case the intermediary system 104 may be omitted.

Example Component Communications

Figure 2:
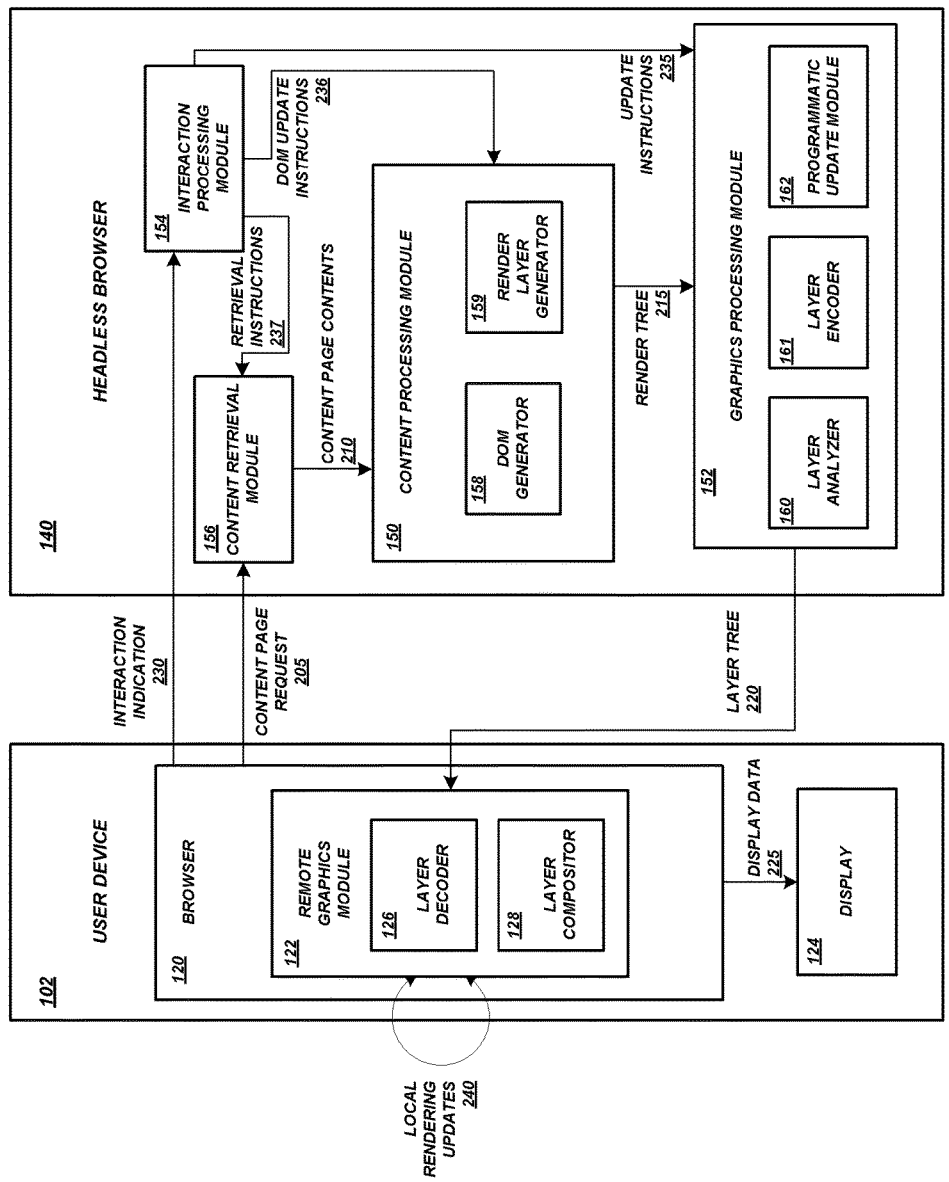
FIG. 2 illustrates example data flows and interactions between a user device and intermediary system during processing and consumption of content using layer transfer rendering according to some embodiments.

FIG. 2 illustrates example data flows and interactions between a user device and intermediary system during processing and consumption of content using layer transfer rendering according to some embodiments. Although the illustrated communications involve the user device 102 and headless browser 140 of FIG. 1, similar communications can take place between any client device and intermediary system capable of executing the layer transfer rendering techniques described herein.

The interactions shown in FIG. 2 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various external objects and including network addresses of servers from where the external objects may be obtained.

As illustrated, the browser 120 of the user device 102 can send a request for a content page 205 to content retrieval module 156 of the headless browser 140. The content page request 205 can be, for example, a request for a web page generated when the user selects a user-selectable option directing the browser 120 to the web page URL. The content page request 205 may be a standardized request, such as an HTML GET request that requests a resource at a particular location. In some embodiments, the content page request 205 may be a request for layers. In some embodiments, the content page request 205 can be accompanied by data representing capabilities of user device 102, for example one or more of processing capabilities, network connection parameters, and configuration of browser 120, to name a few.

As illustrated in FIG. 1, headless browser 140 may be part of a larger intermediary system 104. The intermediary system 104 may instantiate the headless browser 140 to service the request from the client browser 120. For example, the intermediary system 104 may identify a physical server with available resources to handle the request, and the request can be routed to that server for processing by a headless browser instance 140.

In some embodiments, when headless browser 140 receives the content page request 205, the headless browser can assess, for the content page, whether sending the layers of the content page to the user device will reduce a user-perceived page load time relative to at least one alternative rendering technique. In some cases, the headless browser 140 can determine whether the layer transfer rendering technique is preferable for a given page load based on a number of factors, for example the speed, bandwidth, and type of network connection of user device 102 as well as characteristics of the content site. For example, headless browser 140 can determine or predict whether the layer transfer rendering technique will reduce a page load time and/or bandwidth consumption compared to fully rendering the content page on the browser 120 or fully rendering the content page on the headless browser 140.

The content retrieval module 156 can retrieve the content of the content page, for example HTML and image files, from the host system of the content page. In some implementations, the network connection between the content retrieval module 156 and the host system may be faster than the network connection between the user device 102 and the host system, thereby reducing latency in rendering the content page for the user. The content source may be the origin content server, a CDN server, a proxy server, or some other source. In some embodiments, the requested content may already be present at the intermediary system 104. For example, the intermediary system 104 may include a cache 142, as shown in FIG. 1. In such cases, the requested content may be retrieved from the cache 142 rather than the content source 106.

Content processing module 150 can receive content page contents 210 from the content retrieval module 156 and call DOM generator 158 to construct a DOM representation of the content page contents 210, for example based on a DOM definition or specification. As an example, DOM generator 158 can convert elements of an HTML file representation of the content page and any embedded resources into DOM nodes. DOM generator 158 can also parse any available style data, such as style data obtained from a referenced CSS file or style data included in the HTML file. Parsed style data together with markup instructions in the HTML file can be used by the layer generator 159 to create the render tree including one or more layers, which can be sent as render tree data 215 to the graphics processing module 152. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.).

Graphics processing module 152 can call layer analyzer 160 to analyze the layers and determine a suitable encoding technique for each layer, for example based on the content in the layer. In some cases, a suitable encoding technique may be determined based on minimizing bandwidth used to transfer the layer, compatibility with capabilities of user device 102, or minimizing a page load time. Layer analyzer 160 can analyze both the content and layout of the layers to determine suitable encoding.

Layer analyzer 160 can also, in some embodiments, determine whether to combine or split any of the layers in the render tree data 215, for example based on an analysis of the content in the layers. This determination can be based on an analysis of one or both of the content or layout of each layer in the render tree data 215. For example, certain elements may be dynamic in nature, and may therefore require updating more often than other elements, or in response to different events than other elements. Such dynamic elements may therefore be grouped together in a layer separate from static elements of the page. Examples of elements that may trigger creation of a new layer to separate them from the rest of the content page for processing purposes include elements with animation, videos, GIFs, etc. Further, the layout of the layers can indicate that some layers exhibit motion relative to other layers, and the relative motion can be used to determine whether to combine or split render tree layers into new layers. Layers can be combined in some cases based on common determined encoding techniques for layer content and split in some cases where more than one encoding technique is determined for the types of content within a layer.

Layer encoder 161 can encode each layer according to the determined encoding technique. In some embodiments, stationary content can be encoded as either vector graphics commands or as a raster object. For example, a layer including graphical content such as geometric objects can be encoded as a set of graphics commands, such as vector graphics commands such as Skia, in one embodiment, and can be rasterized in another embodiment. A layer including static text content can be encoded as a set of tiles (for example, bitmaps, JPEGs, GIFs, tiffs, or other image file types) as well as graphics instructions indicating to browser 120 where to display the tiles in one embodiment. In another embodiment, static text layers can be encoded as a set of graphics commands such as Skia commands. A layer including image content can be encoded as a plurality of image bytes in some cases. A layer including video content can be sent as a plurality of decoded frames from the original encoded video content or as an encoded video stream in some embodiments. In some embodiments, depending on factors such as video size and network connection of the user device, a layer including video content can be encoded as a URL such that browser 120 can retrieve the video directly from the content host without needing to request updates from headless browser 140 for each new video frame. In some embodiments, video content can be transcoded from one video format to another format, for example a format that the user device can support, and can optionally be compressed after transcoding. For example, some user devices can natively decode certain video formats using less power resources than decoding other video formats, such as enabled by a hardware decoder on the user device. When sending a content page request to a headless browser 140, the browser 120 on the user device may send an indication of such hardware decoders, and headless browser 140 can use this information when making encoding decisions for layers. Each encoded layer can include the content of the layer as well as instructions regarding where to arrange the layer on the content page and how to position the layer relative to other layers (for example, a position relative to a background and/or foreground layer).

Programmatic update module 162 can automatically generate updates to the content and/or layout of a layer, for example in response to execution of a script such as javascript in the page content running on the headless browser 140, or in response to updates to an animated image or video. Such updates can be sent as updated layer tree data 220 including updates to the content and/or layout of some or all of the layers.

The layer tree 220, including encoded layer content data and layer layout data, can be provided to the remote graphics module 122. Layer tree 220 can include or be accompanied by data indicating the determined encoding technique associated with each layer in some embodiments. Some embodiments of the layer tree 220 can include or be accompanied by instructions for a non-visible interactivity layer to preserve interactive features of the content page (i.e., scrollable or drop down menus, navigation options, cursor click and hover events, text input fields, radio buttons, and other user-selectable options) including locations and associated functions of the interactive features. Layer decoder 126 can decode the encoded layers according to a decoding technique corresponding to the determined type of encoding for each layer.

The decoded layers can be provided to layer compositor 128 for generating instructions for display 124 to display a visual representation of the content page based on the layers. In some embodiments, the layer tree can be constructed so that the layers will be decoded and provided to layer compositor 128 in an order in which the layers should be rendered. For example, layer compositor 128 can assemble the decoded layers in the proper positioning and in the proper order (e.g., with a background layer behind other layers, foreground layers covering background layers with overlapping coordinates, and with an interactivity layer in front of the layers). Layer compositor 128 can use the assembled layers to generate instructions to configure display 124 to display a visual representation of the content page.

Instructions for displaying the visual representation of the content page can be sent as display data 225 to the display 124. Display data 225 can indicate how to use the pixels (or voxels) of display 124 to display an image of the content page (or a portion of the content page corresponding to a viewable window based on scrolling or zooming) to the user. Display 124 may be incorporated into user device 102 or external to device 102, and can be any type of known display including LED, LCD, plasma, stereoscopic, and may incorporate touch-sensitive technologies.

The browser 120 can also detect indications 230 of user interaction with elements of the content page, such as user-selectable options (e.g., a hyperlink URL, a graphical button for adding an item to a digital cart, etc.), scrolling, or zooming. The remote graphics module 122 can also be configured to perform local rendering updates 240 in some embodiments. As discussed above, a layer can be generated corresponding to a scrollable portion of the content page. Accordingly, browser 120 can use the scrollable layer data to locally handle scrolling through the layer by updating the portion of the scrollable layer content that is displayed in the viewport, or boundary, of the scrollable layer. The browser 120 can also detect changing graphical content, for example in a GIF or video, and send a request for updated content to the headless browser 140 if needed. In some embodiments the browser 120 may have received a URL corresponding to video content from the headless browser 140, and accordingly may be able to handle the update to the portion of the content page including the video without sending a request to the headless browser 140.

For any interactions that are not able to be handled locally using the provided layer tree 220, browser 120 can send the indications 230 of user interaction to the interaction processing module 154 of the headless browser 140. Interaction processing module 154 can determine whether any updates to the visual representation of the content page are necessitated by the user interaction with the elements of the content page.

In some examples, interaction processing module 154 may determine that the interaction indication requires additional content retrieval, and can send retrieval instructions 237 to the content retrieval module 156 indicating what additional content should be retrieved. For example, a user may select an option to navigate away from the current content page to another content page or to load a new content page.

In some examples, interaction processing module 154 may determine that the interaction indication does not require additional content retrieval but does require an update to the DOM, and can send DOM update instructions 236 to the content processing module 150 indicating what updates to perform to the DOM. For example, page content or layout can change due to execution of a script running on the headless browser, or due to user selection of a drop-down menu. Accordingly, updates to the DOM can provide updates for user manipulation of or programmatic changes to existing content.

In some examples, interaction processing module 154 may determine that the interaction indication does not require additional content retrieval nor an update to the DOM, and can send update instructions 235 to the graphics processing module 152 indicating what updates to perform to the layer tree. For example, a hyperlink, once selected, may change from a first color to a second color. The interaction processing module 154 can determine that such a user interaction with the hyperlink causes an update to the visual representation of the content page. Interaction processing module 154 can also identify a layer or layers corresponding to the update. Accordingly, the interaction processing module 154 can send update instructions 235 to the graphics processing module 152 to generate an updated representation of layer tree 220 for instructing browser 120 to display the hyperlink in the second color.

Example Video Stream Rendering Techniques

Figure 3:
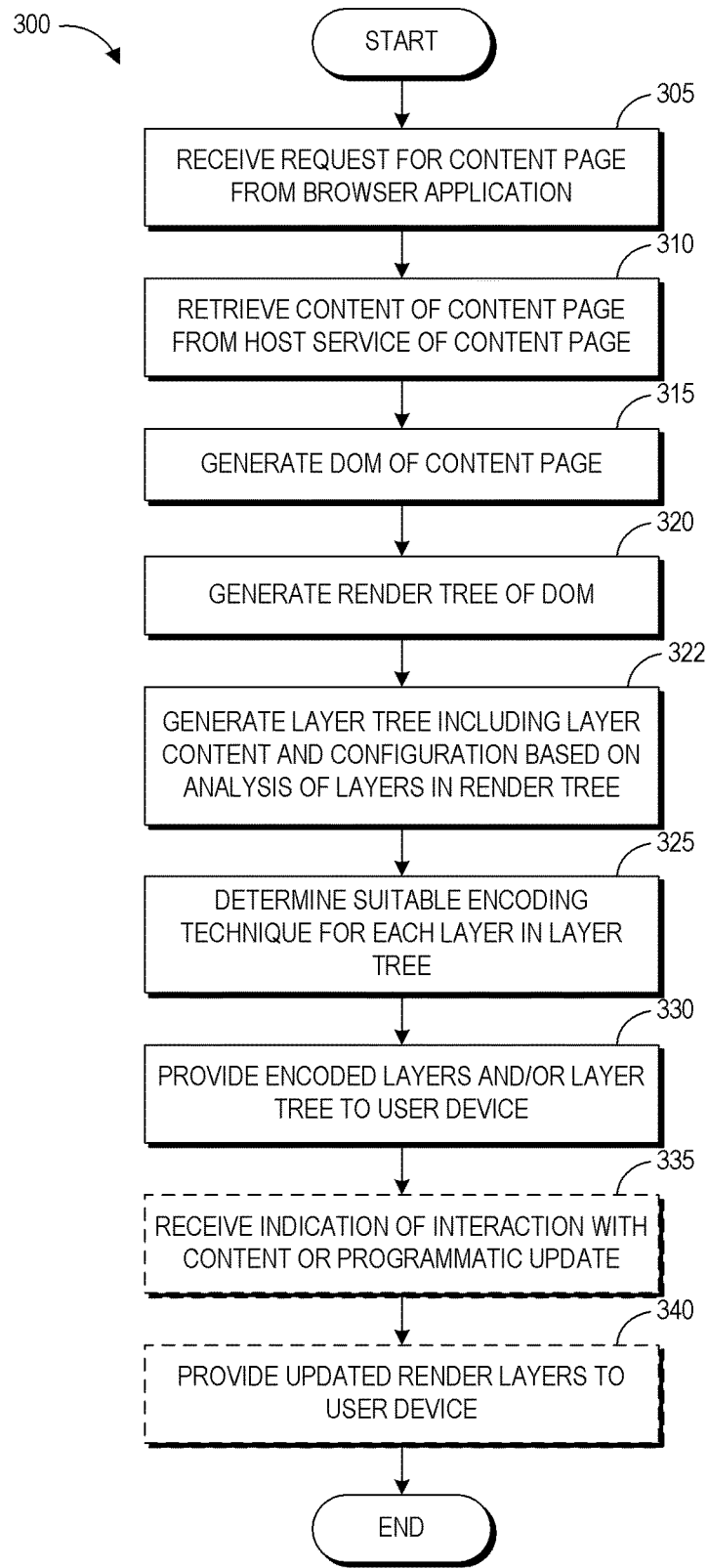
FIG. 3 illustrates an embodiment of a layer transfer rendering technique as implemented by an intermediary system.

FIG. 3 illustrates an embodiment of a layer transfer rendering technique 300 as implemented by an intermediary system. For purposes of illustration, the process 300 is discussed herein as being implemented by the components of the headless browser 140 of FIGS. 1 and 2.

At block 305, the headless browser 140 receives a request for a content page from a user device, for example from browser 120 of user device 102. The headless browser 140 can receive the request via one or more communication networks 110, such as the Internet or a private network, personal area network, local area network, wide area network, cable network, satellite network, cellular telephone network, etc. or combination thereof, each with access to and/or from the Internet. The request for the content page can include an identifier of the content page. The identifier may be based on a content page location represented by, for example, a uniform resource locator (URL) or a uniform resource indicator (URI), and may be received from a user at the browser 120. In some embodiments, the block 305 may also include sending device configuration data and/or metadata associated with the user device 102 to the intermediary system 104. This device configuration data may include any type of data relating to the configuration of the user device 102. For example, the device configuration data may include data relating to screen size, amount of graphics memory, amount of random access memory (RAM), amount of storage space allocated to the browser 120, amount of RAM allocated to the browser 120, capabilities of remote graphics module 122, screen resolution, operating system version, zoom capability of the user device 102, supported font sizes, supported font types, and the like. In some embodiments, the user device may alternatively send a device identifier that can be used by the intermediary system to look up previously-stored information about the device.

At block 310, the content retrieval module 156 of the headless browser 140 retrieves content page contents, for instance one or more of HTML content, XML content, images, and videos. For example, the content retrieval module may retrieve an HTML document, and may then retrieve any inline objects (e.g., images) referenced by the HTML document. The content retrieval module 156 can retrieve the contents from a corresponding origin content server 106. Alternatively, or in addition, the content page or portions thereof may be accessed from one or more CDN servers 108. The content retrieval module 156 can send the content page contents 210 to the content processing module 150.

At block 315, the content processing module 150 can generate a DOM representation of the content page. The DOM representation or "DOM tree" organizes the content of the requested content page, for example into a tree structure including objects of the content page.

At block 320, based on the DOM tree, the content processing module 150 can organize the objects into one or more layers. Each layer can correspond to a different portion of the page or a different type of content in some embodiments. The content processing module 150 can send the DOM tree data and render tree data to the graphics processing module 152.

At block 322, the graphics processing module 152 can analyze the content of the layers in the render tree in order to generate a layer tree including content and layout data for each of a number of layers. As discussed above, in some embodiments the layers in the render tree can be combined and/or split based on an analysis of the content in the layers and/or the positioning or movement of the content in order to generate the layers of the layer tree. Each layer can be associated with certain content data and layout data, where layout data can refer to the size of the layer, positioning of the layer relative to the content page or to other layers, and a depth positioning of the layer (for example, where the layer is located relative to a background or foreground layer). Accordingly, the layers in the layer tree can be more efficiently encoded for transmission to a user device than the layers in the render tree in some embodiments.

At block 325, the graphics processing module 152 can determine a suitable rendering technique for each layer in the layer tree. The determination can be made based on several factors including the content of the layer, capabilities of user device 102, configuration of browser 120, network connection parameters, and the like. In some embodiments, as discussed above, graphics processing module 152 can analyze the layers to determine whether to split a layer or combine two or more layers. This can occur after the determination of suitable rendering techniques in some embodiments and can be based at least partly on the suitable rendering techniques. The determination of whether to split or combine layers can also be based on the content of the layers in some examples.

At block 330, headless browser 140 can provide the layer tree data including encoded layer content and layout to a user device, for example to the browser component 120 of user device 102. In some embodiments, the encoded layers can include or be accompanied by data representing the determined encoding technique for each layer. In some embodiments, the rendering instructions can also include instructions for preserving interactivity of the content page, such as instructions regarding where to include a user selectable option on the content page and what action to associate with selection of the user selectable option.

In certain embodiments, the process 300, or portions thereof, is performed continuously at least until layers are provided to the user device 102 that correspond to the entire content page with all of its content resources. Additional layers may be selectively provided for changing portions of the content page, for example a video included in the content page or effects of user interaction with the content page. The decision of how frequently to perform or re-perform portions of the process 300 (e.g., the provisioning of updated layers to the user device 102) may be based at least partially on a number of factors. These factors may include, for example, settings by a user (e.g., an administrator, a user associated with the client device 102, a user associated with the network page requested at the block 302), configuration data associated with the user device 102, bandwidth available to the user device 102 and/or the intermediary system 104, and the like.

The process 300 also includes optional blocks 335 and 340 for handling updates to the page, for example providing updated encoded layer content and/or layout based on user interaction with the visual representation of the content page as rendered on the user device, or providing an updated encoded layer based on a programmatic update to the layer content and/or layout. At optional block 335, the interaction processing module 154 of the headless browser 140 can receive, from the user device, an indication of user interaction with elements of the content page. User interaction can include selection of user-selectable options, scrolling, zooming, touch input, cursor clicks, cursor hovers, or text input, to name a few. As discussed above, some user interactions can be handled locally in some embodiments. Browser 120 can determine whether the provided layers include sufficient data to locally handle the interaction and can send a request for updated instructions to the headless browser 140 if the instructions are not sufficient. Alternatively or additionally, the headless browser 140 can determine at programmatic update module 162 that changing page content or layout necessitates an update to the layer tree data sent to the user device.

At block 340, the graphics processing module 152 can send updated layer tree data including one or more updated encoded layers to the user device based on the changes to the visual representation of the page resulting from the user interaction and/or programmatic update. In some embodiments, only the layer to which the user interaction and/or programmatic update necessitates an update can be sent to the user 120 to preserve bandwidth, and the remove graphics module 122 can use the updated encoded layer to update the visual representation of the previously sent corresponding layer on the device display. Blocks 335 and 340 can be repeated, in some embodiments, in response to a new indication of user interaction with the content page and/or programmatic.

Blocks 335 and 340 can be executed by the process 300 in embodiments in which the headless browser 140 provides updates to the user device and receives an updated page request from the user device. However, in some embodiments blocks 335 and 340 can be omitted. For example, the layers sent in response to the user request for the content page may include sufficient data for rendering the entire content page including visual updates based on user interaction, for instance so that the user can continue to browse the content page even if the network connection between the user device and the headless browser 140 is interrupted. Accordingly, the user device may handle the updates based on the previously sent graphics commands and blocks 335 and 440 can be omitted.

Figure 4:
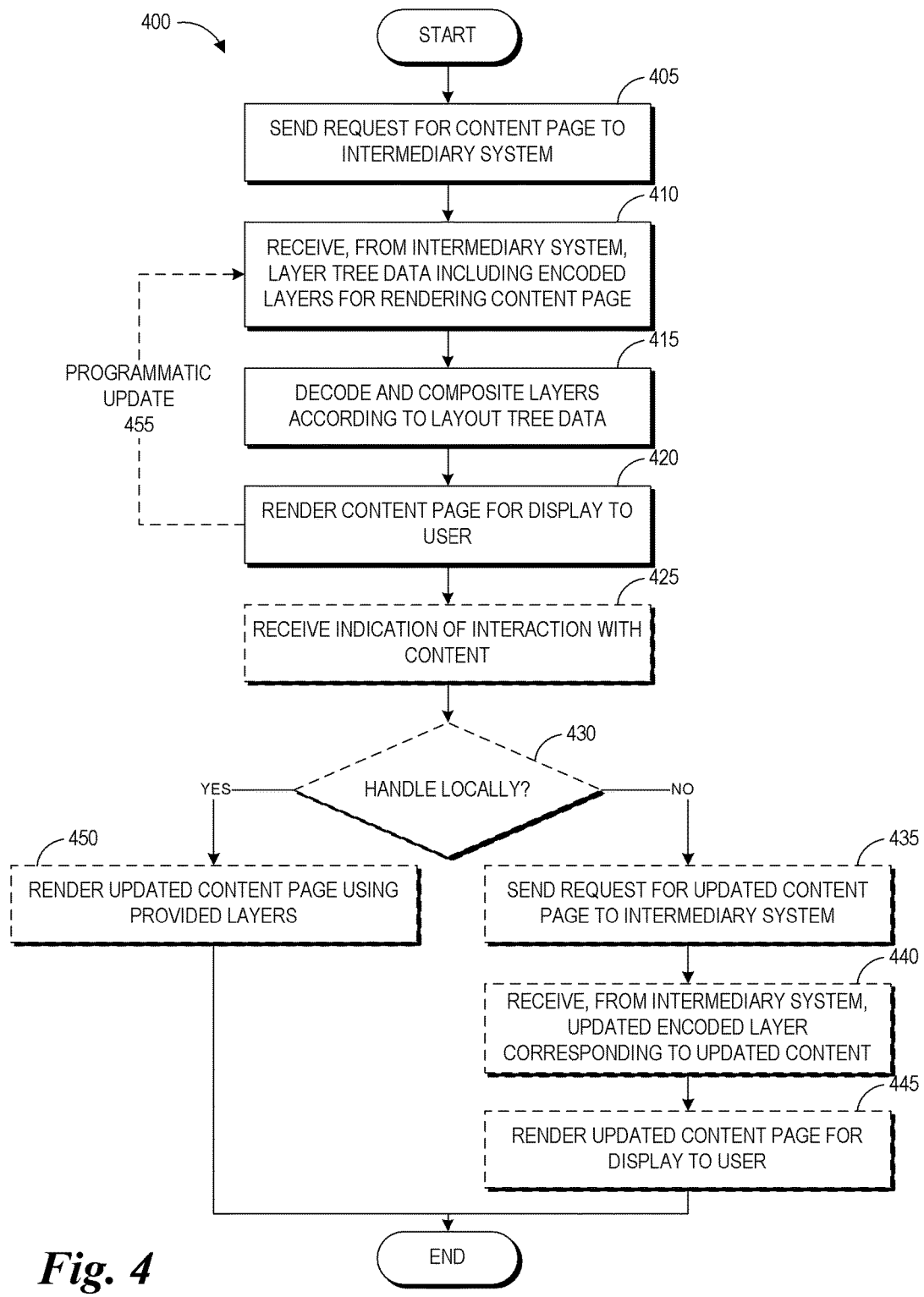
FIG. 4 illustrates an embodiment of a layer transfer rendering technique as implemented by a user device.

FIG. 4 illustrates an embodiment of a layer transfer rendering technique 400 as implemented by a user device. For purposes of illustration, the process 400 is discussed herein as implemented by the browser 120 and other components of the user device 102 of FIGS. 1 and 2, however other client devices can implement the process 400 in other embodiments.

At block 405, the browser 120 sends a request for a content page to an intermediary system. As discussed above, the intermediary system can include a headless browser 140 to communicate with the content page host service and perform some of the graphics rendering for generating a visual representation of the content page for the user.

At block 410, the browser component 120 of the user device 102 receives, from the intermediary system, encoded layers and layer tree data for rendering the requested content page. The rendering instructions can include, for instance, one or more layers of content of the content page encoded in a suitable manner, data representing the determined encoding technique for each layer, and interactivity instructions for non-visible interactive elements as specified by a DOM tree of the content page. Each encoded layer can include the content of the layer as well as instructions regarding where to arrange the layer on the content page (for example, coordinates of layer boundaries) and how to position the layer relative to other layers.

At block 415, the browser component 120, for instance remote graphics module 122, can decode the layers and composite the decoded layers. Remote graphics module 122 can use a decoding technique corresponding to the determined encoding technique for each of the layers to decode the encoded layer. Remote graphics module 122 can then composite the decoded layers according to the layer tree data, that is, assemble the layers according to their respective locations and relative order.

At block 420, remote graphics module 122 can render a visual representation of the content page for display to the user of device 102. Remote graphics module 122 can use the composited layers to determine how to display the pixels or voxels of a display associated with the device 102 in order to present the visual representation of the content page.

In some embodiments, the process can optionally transition from block 420 back to block 410 in response to receiving a programmatic update 455 from the intermediary system. For example, a programmatic update to the content page can result from a script, such as javascript, associated with the content page executing on the intermediary system. Execution of the script can cause the intermediary system to generate an update to one or both of layer content and layout, and intermediary system can accordingly send an update encoded layer to the browser component of the user device for rendering an update to the content page.

Process 400 also includes optional blocks 425-445 for handling interactivity of the page, for example providing an updated visual representation of the content page based on user interaction with the page. In some embodiments, a content page may have no interactive features, and accordingly blocks 425-445 can be omitted from the process 400. In some embodiments, a content page may have interactive features but a user may not interact with any of the interactive features, and accordingly blocks 425-445 can be omitted from the process 400.

At optional block 425 the browser 120 can receive an indication of user interaction with the content page. For example, the user may interact with the page through an input device built in to user device 102 or connected to device 102, for example a mouse, joystick, track pad, touch screen, touch panel, scroll wheel, keypad, button, microphone and voice command recognition module, camera and gesture recognition module, or other input element. The user interaction may include selection of user-selectable options, scrolling, zooming, touch input, cursor clicks, or text input, to name a few.

At optional decision block 430, browser 120 can determine whether the provided layers enable the browser 120 to handle the user interaction or whether browser 120 requires one or more updated layers from headless browser 140. As discussed above, some user interactions can be handled locally in some embodiments. Browser 120 can determine whether the layers provide sufficient data to locally handle the interaction and can send a request for updated instructions to the headless browser 140 if the layers are not sufficient.

If the layers are not sufficient for browser 120 to perform updated rendering associated with the user interaction, at block 435 the browser 120 sends a request for updated layers to the intermediary system. In some embodiments, the request may identify one or more layers to which updates are needed.

At block 440, the browser 120 receives one or more updated encoded layers from the headless browser 140. As discussed above, the updated layer can correspond to only the portion of the content page that is changed by the update in some embodiments. Accordingly, at block 445, the browser 120 can perform the updated rendering based on the updated encoded layers.

If the rendering instructions are sufficient for browser 120 to perform updated rendering associated with the user interaction, at block 450 browser 120 renders the updated content based on the previously provided layers. As discussed above, in some embodiments a provided layer can include content extending beyond the viewable window of browser 120 and accordingly browser 120 may be able to locally render updates in response to a user scrolling.

Example User Interfaces

Figure 5:
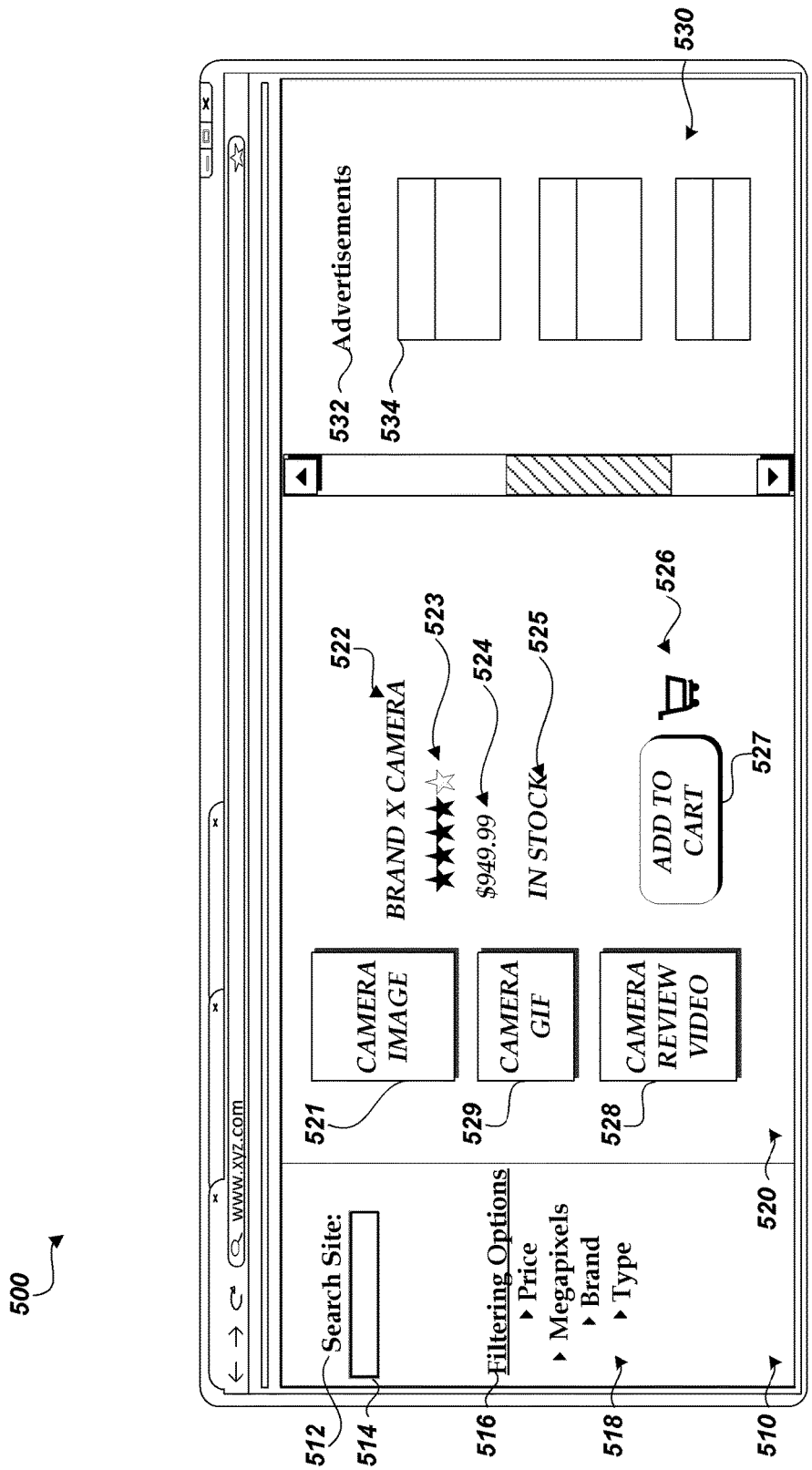
FIG. 5 illustrates an example of a content page that can be rendered using the layer transfer rendering techniques described herein.

FIG. 5 illustrates an example of a content page 500 (e.g., web page) that can be rendered using the layer transfer rendering techniques described herein.

In one example, a render tree of content page 500 may parse the page into three layers: a navigation layer 510, a scrollable content layer 520, and an advertisement layer 530. Navigation layer 510 can include static text 512, 516, dynamic text 518 (for example, dynamic text 518 can shift up or down to display a subset of more specific filtering options if the user selects one of the presented options), and text input box 514. Scrollable content layer 520 can include item image 521, static text 522, 524, 525 as well as the text of button 527 (which will remain static relative to the remainder of the scrollable content layer 520 but not relative to the other layers or the content page as a whole when a user scrolls through scrollable content layer 520), graphical rating representation 523, cart icon 526, camera GIF 529, and camera review video 528. Advertisement layer 530 can include static text 532 and graphical advertisement content 534.

The intermediary system may generate the DOM tree and render tree including the layers 510, 520, and 530, as described above. The intermediary system can analyze the layers 510, 520, and 530 and the corresponding content to determine whether the render tree layers should be split or combined and to determine a suitable encoding technique for each layer.

In one embodiment, the intermediary system may determine that the graphical representation of text box 514 in the navigation layer 510 and graphical advertisement content 534 in the advertisement layer 530 should be encoded similarly, for example as graphics commands, and may split these portions of layers 510 and 530 into a new graphical content layer. Graphical content layer can be encoded as graphics commands and provided to the user device for rendering content page 500.

The intermediary system may determine, in one embodiment, that the static text 512, 516 and the dynamic text 518 of the navigation layer 510 and the static text 532 of the advertisement layer 530 should be encoded similarly, for example as tiles or Skia commands, and can accordingly may split these portions of layers 510 and 530 into a new text content layer. Text content layer can be encoded as tiles or Skia commands and provided to the user device for rendering content page 500.

The intermediary system may analyze the scrollable content layer 520 and determine, in one embodiment, to split the scrollable content layer into three layers based on determined encoding techniques for the content of scrollable content layer 520. A first new layer generated from the scrollable content layer 520 can be a scrollable graphical content layer including item image 521, graphical rating representation 523, cart icon 528, and the graphical representation of button 527. In some embodiments, camera GIF 529 or similar animated image content can be encoded as graphical content with the scrollable graphical content layer, and updates to the camera GIF 529 can be provided as updates to the content of the scrollable graphical content layer. Scrollable graphical content layer can be encoded as graphics commands, for example vector graphics commands or pre-rendered images with graphics commands indicating location of the images, and provided to the user device for rendering content page 500. The browser component of the user device can position the scrollable graphical content layer within the boundaries specified for the scrollable content layer 520 in the render tree.

A second new layer generated from the scrollable content layer 520 can be a scrollable text content layer including static text 522, 524, 525 as well as the text of button 527. The intermediary system may, in some embodiments, combine the scrollable text content layer with the text content layer generated from layers 510 and 530 in some embodiments. However, because the scrollable text content layer can move relative to the text content layer generated from layers 510 and 530 when the user scrolls through portion 520 of the content page, the intermediary system can keep these layers separate in some embodiments. The browser component of the user device can position the scrollable text layer over the scrollable graphical content layer and within the boundaries specified for the scrollable content layer 520 in the render tree.

A third new layer generated from the scrollable content layer 520 can be a video content layer including video 528. The video content layer can be encoded, in one embodiment, using a known video codec. In another embodiment, video content layer can be encoded as a URL of the corresponding video. The video content layer can also be transcoded into a format preferred for decoding by a hardware decoder of the user device. Video content layer can also be encoded with instructions regarding where to position the video content layer over the scrollable text layer and the scrollable graphical content layer, and within the boundaries specified for the scrollable content layer 520 in the render tree. In some embodiments, camera GIF 529 can be encoded as video content with the video content layer, and updates to the camera GIF 529 can be provided as updates to the content of the video content layer.

Although one example of how to convert a render tree into layers and corresponding encoding techniques has been discussed with respect to FIG. 5, this is for purposes of example only and is not intended to be limiting. Based on factors such as content page content, browser characteristics, user device capabilities, and network connection, among others, an intermediary system can adaptively parse a content page into layers to optimize page load time, minimize bandwidth consumption, or a balance of the two.

Figure 6B:
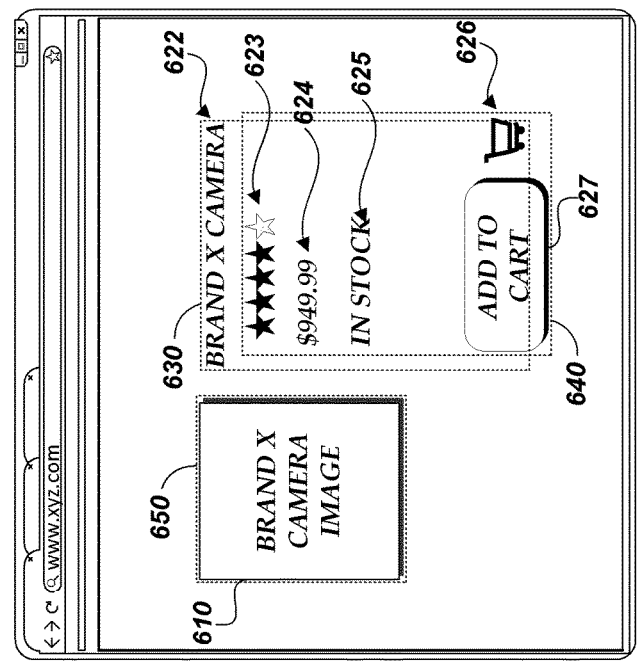
FIGS. 6A-6B illustrate another example of a content page that can be rendered using the layer transfer rendering techniques described herein
Figure 6A:
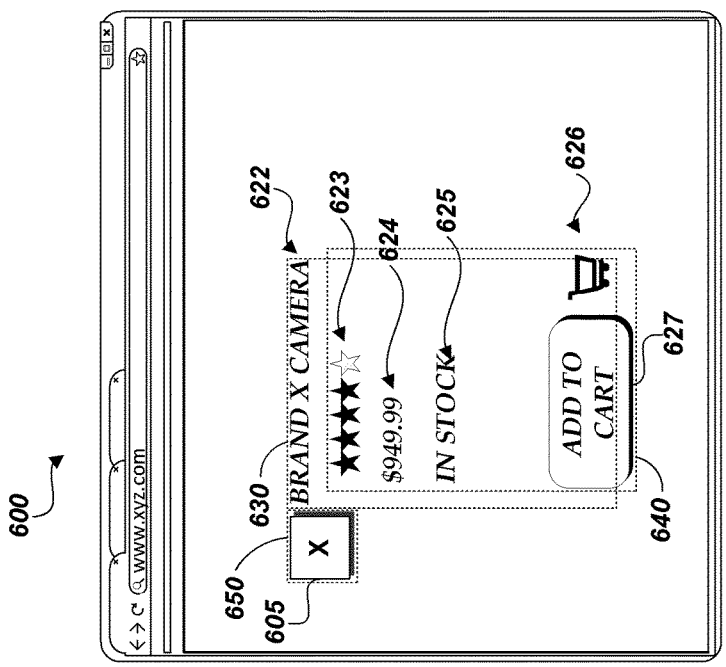

FIGS. 6A and 6B illustrate another example of a content page 600 (e.g., web page) that can be rendered using the layer transfer rendering techniques described herein, wherein the differences in layer content and configuration between FIGS. 6A and 6B provide one example of differential updates to layer content and layer configuration.

In one example, a render tree of content page 600 may parse the page into three layers: (1) a text layer 630 including text 622, 624, 625, and the text of user interface button 627, (2) a graphics layer 640 including the graphical rating representation 523, cart icon 626, and the graphical elements of user interface button 627, and (3) an image layer 650 including item image 610.

The intermediary system may determine, in one embodiment, that the text layer 630 should be encoded as tiles or Skia commands, and can accordingly send a suitably encoded version of the text layer 630 to the user device for use in rendering the content page 600. The intermediary system may determine, in one embodiment, that the graphics layer 640 should be encoded as vector graphics commands such as Skia commands. In another embodiment, the intermediary system may determine that the graphics layer should be encoded as a raster object. The intermediary system can send a suitably encoded version of the text layer 630, graphics layer 640, and image layer 650 to the user device for use in rendering the content page 600. For each layer, the intermediary system can send the layer content and layer configuration, such as coordinates or other representations of size and/or page position, to the user device. The intermediary system can send the layer content and configuration data as a layer tree indicating to the user device where and in what order to render the layers.

As illustrated in FIG. 6A, in some embodiments the intermediary system may determine, based on a variety of factors such as network connection parameters and user device capabilities, whether to prioritize the text layer 630 and graphics layer 640 over the image layer 650. In such embodiments, the intermediary system may send all of the layer tree data for text layer 630 and graphics layer 640 and none or some of the layer tree data for image layer 650. Accordingly, as illustrated in FIG. 6A, image layer 650 can include an image loading placeholder 605 as the user device renders the text layer 630 and graphics layer 640 before the image layer 650. The image layer 650 can be sized based on the size of image loading placeholder 605.

As illustrated in FIG. 6B, the user device can subsequently receive updated layer tree data for the image layer 650 that instructs the device to render image 610. Accordingly, the content of the image layer 650 is updated to display image 610 and the size of the image layer 650 is updated based on the size of image 610. Due to the increased size of the image layer 605, the intermediary system may also include coordinate or positioning updates in the updated layer tree data regarding new locations on the page 600 for text layer 630 and graphics layer 640. Instead of re-rendering text layer 630 and graphics layer 640, the user device can move the already rendered layers to the new locations identified in the updated layer tree data from the intermediary system.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for providing access to network-accessible content, the system comprising:
   a browser component adapted to run on a user device, the browser component configured to provide a user interface on a display of the user device; and
   an intermediary system responsive to a request from the user device for a content page by retrieving the content page from a host system, the intermediary system comprising one or more computing devices and further comprising:
      a content processing module configured to generate a render tree representation of the content page; and
      a graphics processing module configured to:
         generate, based at least partly on the render tree representation, a layer tree including content data and layout data for each of a plurality of layers usable for rendering a visual representation of the content page;
         analyze the plurality of layers to determine whether to combine or split at least a portion of the content data of any of the plurality of layers, wherein determining whether to combine or split is based on an encoding technique determined for the portion of the content data;
         combine or split the plurality of layers based on analyzing the plurality of layers such that a different encoding technique of a plurality of different encoding techniques is selected for each layer of the plurality of layers, wherein the selected encoding technique decreases bandwidth usage in sending the layer to the user device relative to sending the content of the layer without encoding; and
         generate, for each layer of the plurality of layers of the layer tree, encoded layer data by encoding the layer according to the selected encoding technique;
   wherein the intermediary system is further configured to send the encoded layer data to the user device;
   wherein the browser component is configured to render the visual representation of the content page on the display of the user device based at least partly on the encoded layer data.

2. The system of claim 1, wherein one of the intermediary system or the browser component configured to run on the user device is configured to assess, for the content page, whether sending the encoded layer data to the user device will reduce a perceived page load time relative to at least one content delivery technique.

3. The system of claim 1, wherein the graphics processing module is further configured to select a different encoding technique for at least two of the plurality of layers.

4. The system of claim 1, wherein the graphics processing module is configured to:
   analyze one or both of the content data and layout data for the plurality of layers and determine one layer of the plurality of layers to split into two or more additional layers; and
   split the determined layer into the two or more additional layers.

5. The system of claim 4, wherein the determined layer is associated with two or more encoding techniques and wherein the two or more additional layers each are associated with a different encoding technique.

6. The system of claim 1, wherein the graphics processing module is configured to:
   analyze one or both of the content data and layout data for the plurality of layers and determine two or more layers of the plurality of layers to combine into an additional layer; and
   combine the determined two or more layers into the additional layer.

7. The system of claim 6, wherein the determined two or more layers are associated with a single encoding technique and wherein the additional layer is associated with the single encoding technique.

8. The system of claim 1, wherein the browser component comprises a remote graphics module configured to decode and composite the plurality of layers.

9. A method of providing access to network-accessible content system, the method comprising, by an intermediary system that operates as an intermediary between user devices and content servers:
   receiving, from a browser component running on a user device, a request for a content page;
   retrieving the content page from a host system;
   generating a render tree representation of the content page;
   generating, based at least partly on the render tree representation, a layer tree including content data and layout data for a plurality of layers for rendering a visual representation of the content page;
   analyzing the plurality of layers to determine whether to combine or split at least a portion of the content data of any of the plurality of layers, wherein determining whether to combine or split is based on a type of encoding determined for the portion of the content data;
   combining or splitting the plurality of layers based on the analyzing such that a different type of encoding of a plurality of different types of encoding is selected for each layer of the plurality of layers, the selected type of encoding decreasing bandwidth usage in sending the layer to the user device relative to relative to sending the content of the layer without encoding;
   encoding the layer according to the selected type of encoding; and
   sending the layer tree, including the content data and the layout data for the plurality of layers, wherein the content data and the layout data include the encoded layer, over a network to the browser component running on the user device for rendering the visual representation of the content page on a display associated with the user device;

wherein the intermediary system comprises one or more computing devices and is separate from the user device and the host system.

10. The method of claim 9, further comprising selecting a type of encoding for each of the plurality of layers.

11. The method of claim 10, further comprising encoding each of the plurality of layers according to the selected type of encoding.

12. The method of claim 10, further comprising selecting a different type of encoding for at least two of the plurality of layers.

13. The method of claim 10, further comprising determining, based on the selected type of encoding for each of the plurality of layers, whether to split or combine any of the plurality of layers.

14. The method of claim 9, further comprising determining, based on an analysis of relative motion of layers to one another indicated by the layout data, whether to split or combine any of the plurality of layers.

15. The method of claim 9, further comprising assessing, for the content page, whether sending the layers to the browser component will reduce a perceived page load time relative to at least one alternative content delivery technique.

16. The method of claim 9, further comprising determining an update indication including one or both of an indication of user interaction with the visual representation of the content page or identifying a programmatic initiated update.

17. The method of claim 16, further comprising assessing whether the plurality of layers are sufficient for the user device to render an update to the visual representation of the content page responsive to the update indication.

18. The method of claim 17, further comprising generating an update to one or both of the content data and layout data for at least one of the plurality of layers in response to determining that the layers are not sufficient to render the update.

19. The method of claim 18, further comprising sending the update to the user device.

20. A non-transitory computer-readable medium storing computer executable instructions that direct a user device to perform operations comprising:

sending a request for a content page to an intermediary system that operates as an intermediary between user devices and content servers;

receiving, from the intermediary system, a layer tree including content data and layout data for each of a plurality of layers generated by the intermediary system based at least partly on a render tree representation of the content page, wherein the plurality of layers have been split or combined in response to encoding techniques determined for portions of the content data such that at least two of the plurality of layers are each encoded with a different one of a plurality of different encoding techniques selected to decrease bandwidth usage in receiving the layer from the intermediary system relative to sending the content of the layer without encoding;

generating, based at least partly on the plurality of layers, instructions to configure a display associated with the user device to display the visual representation of the content page; and rendering, based at least partly on the instructions, the visual representation of the content page on the display of the user device.

21. The non-transitory computer-readable medium of claim 20, wherein each of the plurality of layers is encoded according to an encoding technique determined by the intermediary system, the operations further comprising decoding each of the plurality of layers according to a decoding technique associated with the determined encoding technique.

22. The non-transitory computer-readable medium of claim 20, further comprising compositing the plurality of layers via the browser component to generate the visual representation of the content page.

* * * * *

UNITED STATES PATENT AND TRADEMARK OFFICE
CERTIFICATE OF CORRECTION

PATENT NO. : 9,922,007 B1  
APPLICATION NO. : 14/285442  
DATED : March 20, 2018  
INVENTOR(S) : Saral Jain et al.

Page 1 of 1

It is certified that error appears in the above-identified patent and that said Letters Patent is hereby corrected as shown below:

In the Specification

In Column 2 at Line 37, after "herein" insert --.--.

In the Claims

In Column 24 at Line 60 (Claim 9, Line 18), change "relative to relative to" to --relative to--.

Signed and Sealed this  
Third Day of July, 2018

Andrei Iancu  
*Director of the United States Patent and Trademark Office*